(12) United States Patent
Ruskin et al.

(10) Patent No.: US 10,991,055 B1
(45) Date of Patent: Apr. 27, 2021

(54) SYSTEM FOR RECOMMENDING SOCIAL MEDIA METADATA TAGS AND RELATED METHODS

(71) Applicant: INMAR CLEARING, INC., Winston-Salem, NC (US)

(72) Inventors: Grazia Ruskin, Austin, TX (US); Bryan Bartow, Leander, TX (US); Chris Rebstock, Round Rock, TX (US)

(73) Assignee: INMAR CLEARING, INC., Winston-Salem, NC (US)

( * ) Notice: Subject to any disclaimer, the term of this patent is extended or adjusted under 35 U.S.C. 154(b) by 342 days.

(21) Appl. No.: 16/025,661

(22) Filed: Jul. 2, 2018

(51) Int. Cl.
*G06Q 10/00* (2012.01)
*G06Q 50/00* (2012.01)
*G06F 16/16* (2019.01)

(52) U.S. Cl.
CPC ........... *G06Q 50/01* (2013.01); *G06F 16/164* (2019.01)

(58) Field of Classification Search
CPC ............................ G06Q 50/01; G06F 16/164
See application file for complete search history.

(56) References Cited

U.S. PATENT DOCUMENTS

| 9,245,271 | B1 * | 1/2016 | Ahmed | G06Q 30/0631 |
| 10,250,547 | B1 * | 4/2019 | Jain | H04L 51/32 |
| 2007/0214097 | A1 * | 9/2007 | Parsons | G06Q 30/0264 706/12 |
| 2012/0265806 | A1 * | 10/2012 | Blanchflower | H04L 51/32 709/204 |
| 2013/0080611 | A1 * | 3/2013 | Li | H04N 21/222 709/223 |
| 2013/0298084 | A1 | 11/2013 | Spivack et al. | |
| 2013/0304818 | A1 | 11/2013 | Brumleve et al. | |

(Continued)

OTHER PUBLICATIONS

"Time-aware Personalized Hashtag Recommendation on Social Media" Qi Zhang, Yeyun Gong, Xuyang Sun, Xuanjing Huang Shanghai Key Laboratory of Intelligent Information Processing School of Computer Science, Fudan University 825 Zhangheng Road, Shanghai, P.R.China {qz, 12110240006, 13210240106, xjhuang}@fudan.edu.cn.*

(Continued)

*Primary Examiner* — Gabrielle A Mccormick
(74) *Attorney, Agent, or Firm* — Allen, Dyer, Doppelt + Gilchrist, P.A.

(57) ABSTRACT

A system for recommending social media metadata tags may include a user device configured to accept, as an input, a keyword associated with social media content to be published. A metadata tag recommendation server may obtain the keyword from the user device, and generate recommended social media metadata tags based upon the keyword. The server may also determine a respective relevance of each recommended social media metadata tag within a given social media platform based upon at least one property of the recommended social media metadata tag, and determine a respective reach characteristic of each recommended social media metadata tag within the given social media platform. The server may also assign a respective score to each of the recommended social media metadata tags based upon the respective relevance and respective reach characteristic thereof, and communicate the recommended social media metadata tags and respective scores to the user device.

21 Claims, 7 Drawing Sheets

(56) References Cited

U.S. PATENT DOCUMENTS

| | | | |
|---|---|---|---|
| 2013/0311408 A1* | 11/2013 | Bagga | G06N 20/00 |
| | | | 706/12 |
| 2014/0156743 A1* | 6/2014 | Veda | G06Q 10/10 |
| | | | 709/204 |
| 2014/0358911 A1 | 12/2014 | Mccarthy et al. | |
| 2016/0080485 A1 | 3/2016 | Hamedi | |
| 2018/0144052 A1* | 5/2018 | Sayyadi-Harikandehei | |
| | | | H04N 21/231 |

OTHER PUBLICATIONS

"A hashtag recommendation system for twitter data streams" Eriko Otsuka, Scott A. Wallace & David Chiu. Computational Social Networks vol. 3, Article number: 3 (2016).*

* cited by examiner

SYSTEM FOR RECOMMENDING SOCIAL MEDIA METADATA TAGS AND RELATED METHODS

TECHNICAL FIELD

The present embodiments are directed to the field of social media, and more particularly, to social media metadata tags and related methods.

BACKGROUND

With respect to social media platforms, a marketer or content contributor may implement a number of strategies to increase exposure of the content, for example, to increase reach and engagement, particularly in a heavily saturated social media space. One particular strategy involves the use of social media metadata tags or hashtags. A social media metadata tag may carry a relatively large amount of weight with a social media platform. For example, a given social media metadata tag may help content or posts reach a target audience, attract followers in a niche market, increase engagement, and develop a more positive and recognizable brand image. Since social media metadata tags may be considered, for certain social media platforms, a way of sorting content or posts, a content provider or marketer may rely relatively heavily on social media metadata tags.

SUMMARY

A system for recommending a plurality of social media metadata tags may include a user device configured to accept, as an input, at least one keyword associated with social media content to be published. The system may also include a metadata tag recommendation server that includes a memory and a processor for cooperating therewith to obtain the at least one keyword from the user device, and generate a plurality of recommended social media metadata tags based upon the at least one keyword. The memory and processor may cooperate to determine a respective relevance of each of the plurality of recommended social media metadata tags within a given social media platform based upon at least one property of the recommended social media metadata tag. The memory and processor may also cooperate to determine a respective reach characteristic of each of the plurality of recommended social media metadata tags within the given social media platform, and assign a respective score to each of the recommended social media metadata tags based upon the respective relevance and respective reach characteristic thereof. The memory and processor may further cooperate to communicate the plurality of recommended social media metadata tags and respective scores to the user device.

The at least one property may include social media content associated with each of the plurality of recommended social media metadata tags, for example. The at least one property may include a respective title of social media content associated with each of the plurality of recommended social media metadata tags.

The at least one property may include a respective volume associated with each of the plurality of recommended social media metadata tags. The processor may be configured to group the plurality of recommended social media metadata tags based upon the respective volumes, for example.

The plurality of recommended social media metadata tags may include a plurality of recommended social media hashtags, for example. The respective reach characteristic may include at least one of a respective reach and a respective reach velocity of each of the plurality of recommended social media metadata tags, for example. The processor may be configured to order the plurality of recommended social media metadata tags based upon the respective scores.

The memory may be configured to store a plurality of the respective scores over time. The processor may be configured to assign a current respective score to each of the recommended social media metadata tags based upon the stored plurality of the respective scores over time. The processor may be configured to predict a future respective score for the at least one keyword based upon the current respective score and the stored plurality of the respective scores over time, for example.

A method aspect is directed to a method of recommending a plurality of social media metadata tags. The method may include using a metadata tag recommendation server that includes a memory and a processor for cooperating therewith to obtain at least one keyword from a user device. The user device may be configured to accept, as an input, the at least one keyword associated with social media content to be published. The method may also include using the metadata tag recommendation server to generate a plurality of recommended social media metadata tags based upon the at least one keyword, and determine a relevance of each of the plurality of recommended social media metadata tags within a given social media platform based upon at least one property of the recommended social media metadata tag. The method may further include using the metadata tag recommendation server to determine a respective reach characteristic of each of the plurality of recommended social media metadata tags within the given social media platform, and assign a respective score to each of the recommended social media metadata tags based upon the respective relevance and respective reach characteristic thereof. The method may further include using the metadata tag recommendation server to communicate the plurality of recommended social media metadata tags and respective scores to the user device.

A computer readable medium aspect is directed to a non-transitory computer readable medium for recommending a plurality of social media metadata tags. The non-transitory computer readable medium includes computer executable instructions that when executed by a processor of a metadata tag recommendation server cause the processor to perform operations. The operations may include obtaining at least one keyword from user device. The user device may be configured to accept, as an input, the at least one keyword associated with social media content to be published. The operations may include generating a plurality of recommended social media metadata tags based upon the at least one keyword, and determining a respective relevance of each of the plurality of recommended social media metadata tags within a given social media platform based upon at least one property of the recommended social media metadata tag. The operations may also include determining a respective reach characteristic of each of the plurality of recommended social media metadata tags within the given social media platform, and assigning a respective score to each of the recommended social media metadata tags based upon the respective relevance and respective reach characteristic thereof. The operations may further include communicating the plurality of recommended social media metadata tags, and respective scores to the user device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1A:
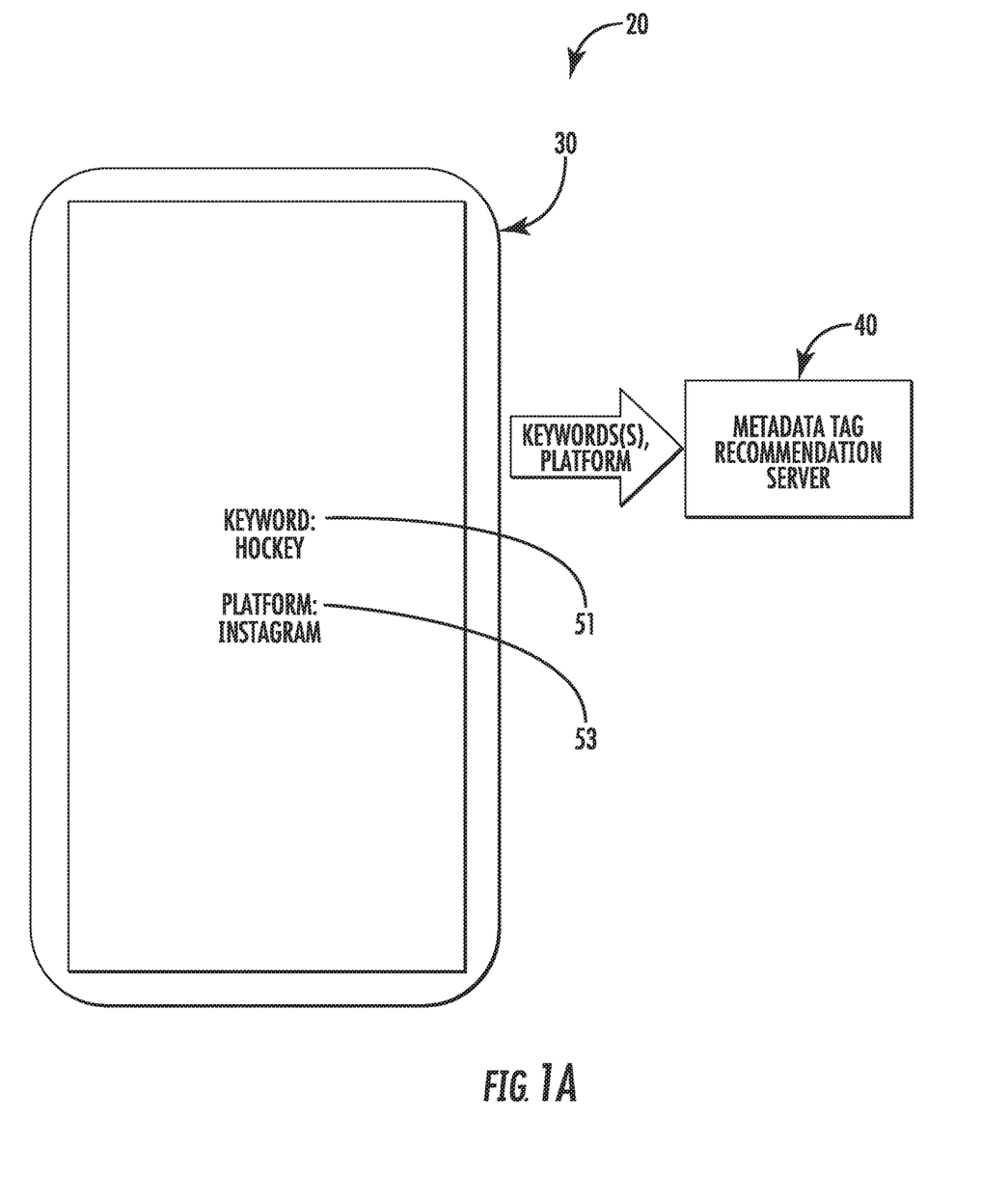
FIG. 1A is a schematic diagram of a system for recommending social media metadata tags in accordance with an embodiment.
Figure 1B:
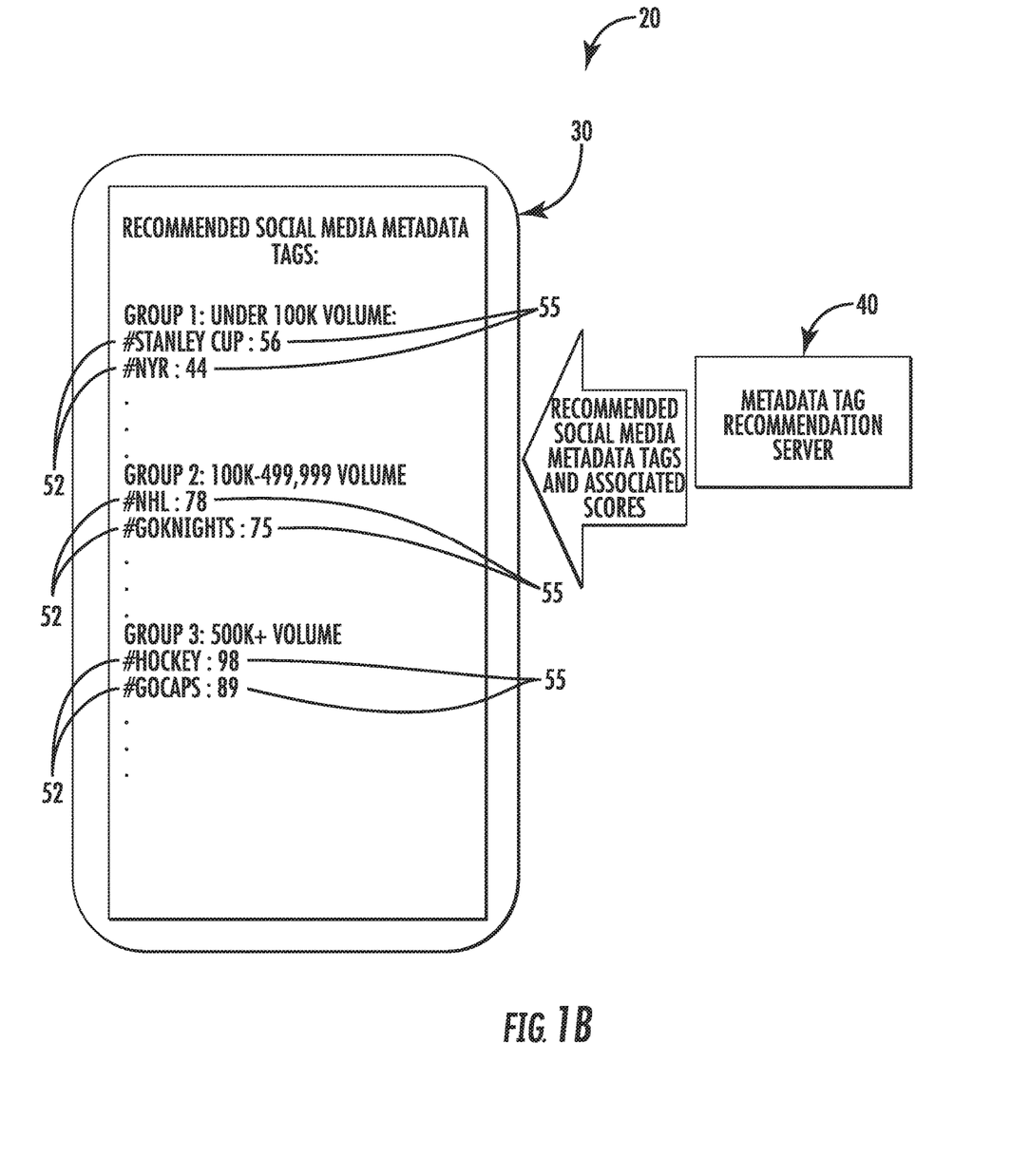
FIG. 1B is another schematic diagram of a system for recommending social media metadata tags in accordance with the embodiment of FIG. 1A.
Figure 2:
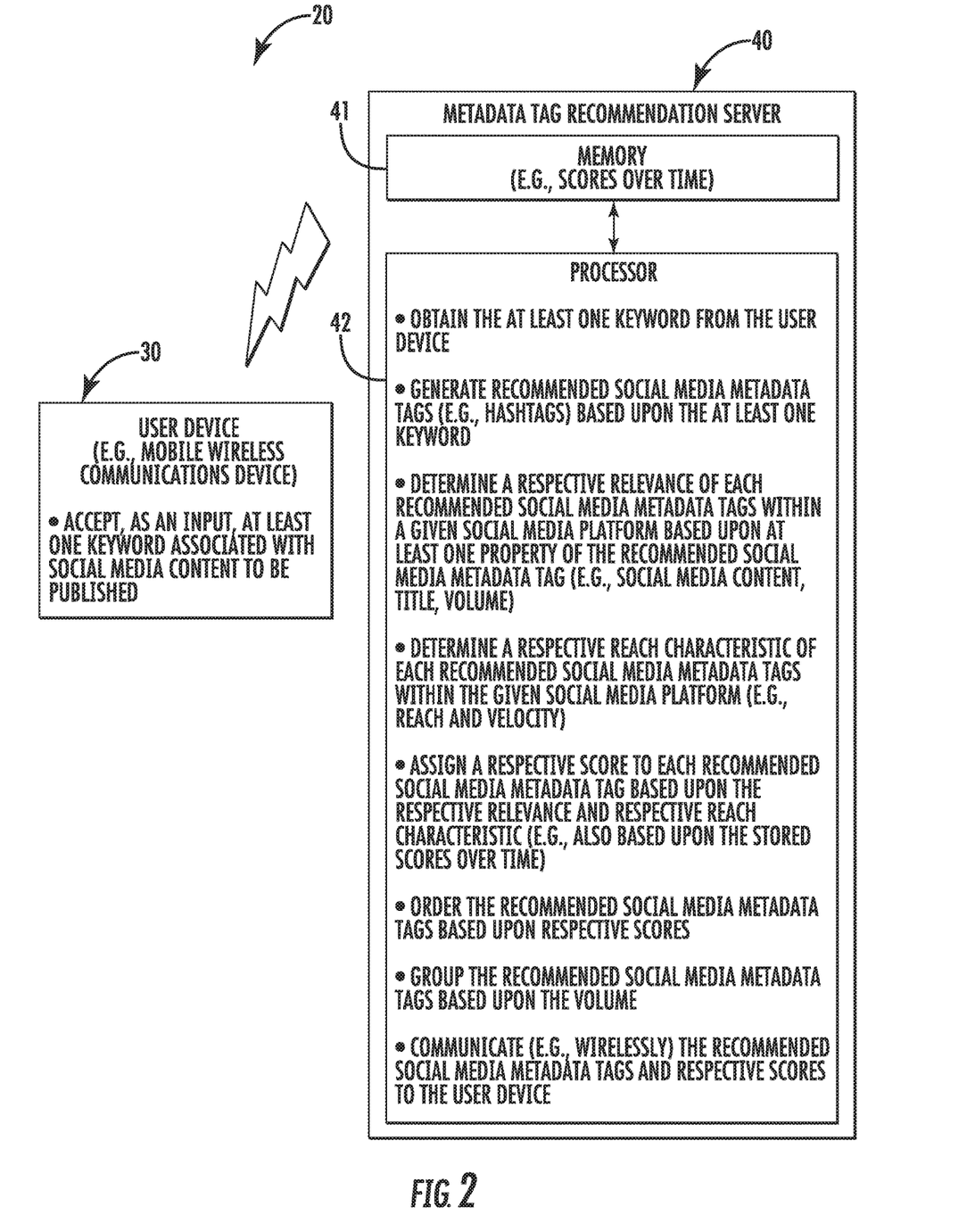
FIG. 2 is a schematic block diagram of a system for recommending social media metadata tags in accordance with the embodiments of FIGS. 1A and 1B.

Referring initially to FIGS. 1A, 1B, and 2, a system for recommending social media metadata tags 20 includes a user device 30 that accepts, as an input, a keyword 51 associated with social media content to be published. More than one keyword 51 may be input. The user device 30 may be a personal computer (e.g., desktop or laptop computer), tablet computer, wearable device, or mobile wireless communications device (e.g., a smartphone). Of course, the user device 30 may be another type of device. The keyword 51 may be a desired keyword or hashtag to associate with social media content, such as, for example, a posting on a given social media platform 53 (e.g., Facebook, Twitter, Instagram, etc.). For example, if a user is going to publish social media content about hockey, the user may wish to tag the content with social media metadata tags and may thus input the keyword "hockey." In some embodiments, the user may also select the desired social media platform 53, for example, as input to the user device 30.

The system 20 also includes a metadata tag recommendation server 40 that includes a memory 41 and a processor 42 for cooperating with the memory. The processor 42 and the memory 41 may cooperate to perform functions of the metadata tag recommendation server 40 as will be described herein. Accordingly, it should be understood that when functions of the metadata tag recommendation server 40 are described, those functions are a result of cooperation of the memory 41 and processor 42.

Figure 3:
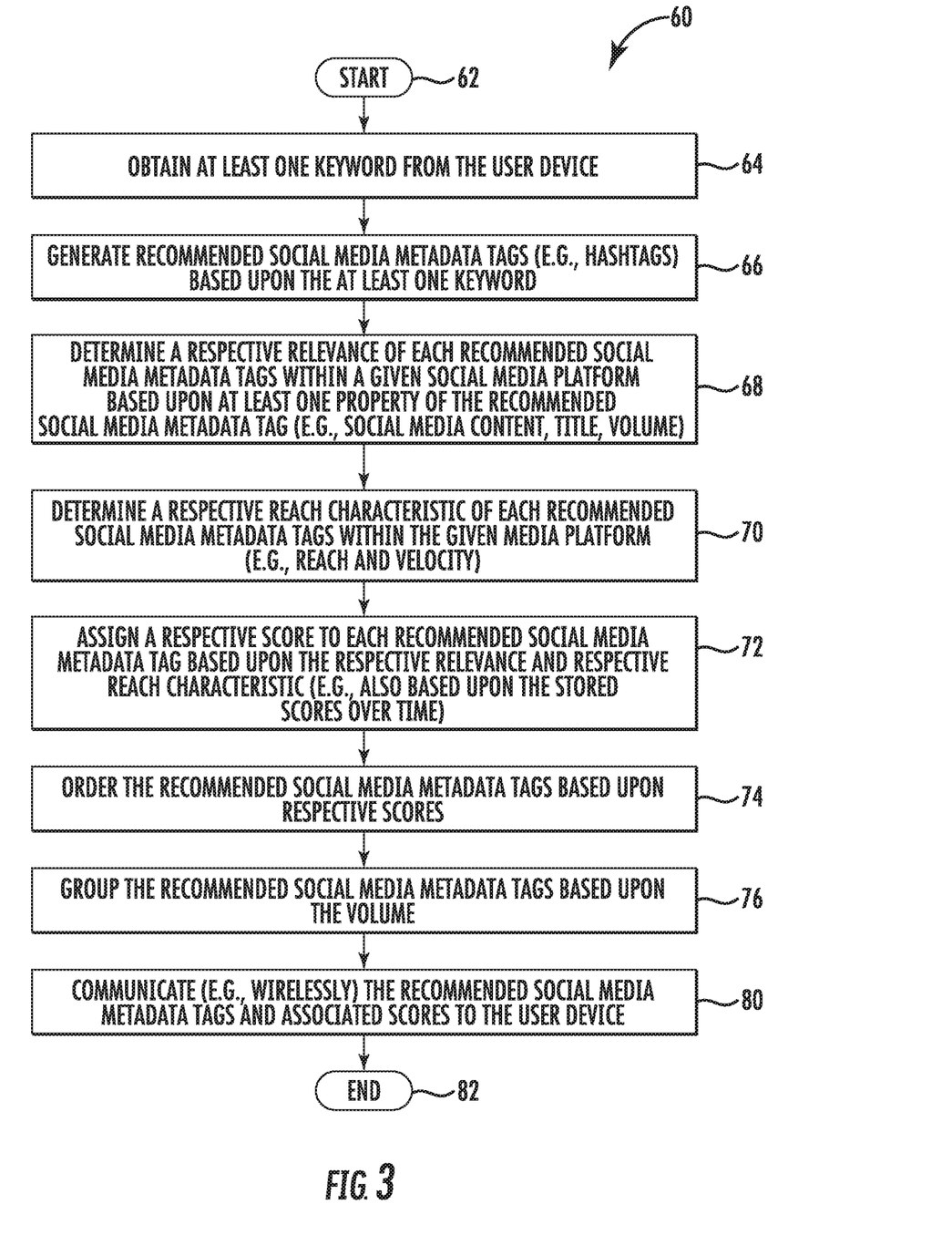
FIG. 3 is a flowchart of the operation of a metadata tag recommendation server in accordance with an embodiment.

Referring additionally to the flowchart 60 in FIG. 3, beginning at Block 62, operation of the metadata tag recommendation server 40 will now be described. At Block 64, the metadata tag recommendation server 40 obtains the keyword 51 from the user device 30. The metadata tag recommendation server 40 may receive the keyword 51 by way of one or more computer networks, which may include wired and/or wireless networks, for example, the Internet.

The metadata tag recommendation server 40, at Block 66, generates recommended social media metadata tags 52, for example hashtags, based upon the keyword 51. The metadata tag recommendation server 40 may generate additional or other types of social media metadata tags 52. The metadata tag recommendation server 40 may generate the recommended hashtags 52 based upon variations of the keyword 51, how others are using variations of the keyword on a given social media platform 53, and/or other social media metadata tags that are used with the keyword or the keyword as a social media metadata tag (e.g., a given social media platform may permit up to thirty (30) social media metadata tags for a post or content item). Other techniques may be used to generate the recommended social media metadata tags 52. However, different from conventional social media metadata or hashtag generators, the system 20 considers additional factors so that the recommended social media metadata tags 52 may be considered optimized to provide increased reach, for example, as will be described in further detail below. A typical social media metadata tag may not consider the factors and properties described below when recommending social media metadata tags.

The metadata tag recommendation server 40 determines a respective relevance of each of the recommended social media metadata tags 52 within a given social media platform 53 based upon one or more properties of the recommended social media metadata tag (Block 68). The relevance may include a relevance score, for example. A property of each of the recommended social media metadata tags 52 may include respective social media content associated with each of the recommended social media metadata tags. For example, the metadata tag recommendation server 40 may, for a given keyword 51, such as "hockey," obtain, crawl, or otherwise parse content (e.g., articles, blogs, posts, etc.) from the given social media platform 53 for usage of the term "hockey." The amount or frequency of the usage of keyword 51, adjacent words, and/or context of the content may be used to determine the relevance (e.g., a post that is about hockey may be considered more relevant that a post the merely mentions hockey).

Another property of the recommended social media metadata tags 52 may include a respective title (e.g., a headline, tagline) of social media content associated with each of the recommended social media metadata tags. For example, the metadata tag recommendation server 40 may, for example, for the keyword 51 "hockey," search, parse, crawl, or otherwise obtain titles for social media content on the given social media platform 53. Content with the keyword or related words in the title may be considered more relevant.

Another property of the recommended social media metadata tags 52 may include a respective volume (e.g., how many posts or how content) associated with each of the recommended social media metadata tags 52. For example, the metadata tag recommendation server 40 may, for example, for the keyword 51 "hockey," count or obtain (e.g., through a public facing application programming interface (API) associated with the given social media platform 53) a number of posts for social media content on the given social media platform. A higher volume of a given recommended social media metadata tag 52 may be considered more relevant. Other and/or additional properties may be used by the metadata tag recommendation server 40 to determine the relevance.

At Block 70, the metadata tag recommendation server 40 determines a respective reach characteristic of each recommended social media metadata tag 52 within the given social media platform 53. A reach characteristic may include a reach (e.g., impressions, reads, how many users have seen content or posts) associated with each of the recommended social media metadata tags 52. The reach characteristic may also include a reach velocity of each of the recommended social media metadata tags 52. A reach velocity may be considered a measure of how viral content or a post may be considered. In other words, reach velocity may be considered the change in reach over time.

The metadata tag recommendation server 40 assigns a respective score 55 to each of the recommended social media metadata tags 52 based upon the relevance and reach characteristic thereof (Block 72). For example, a more relevant recommended social media metadata tag 52 that has a higher reach may generally score higher than a recommended social media metadata tag that is less relevant and/or has a smaller reach. A score may be based upon 100, for example, with a higher score (e.g., closer to 100) being an indicator that the associated recommended social media metadata tag 52 is more optimized for the keyword 51.

In some embodiments, the metadata tag recommendation server 40 may store, for example, in the memory 41, recommended social media metadata tags 52 and corresponding scores 55 over time (i.e., historical recommended social media metadata tags and associated historical scores). The date and/or time associated with the historical recommended social media metadata tags 52 and corresponding scores 55 may also be stored memory 41 (e.g., the date the recommended social media metadata tags and scores were generated and assigned). The score 55 assigned by the metadata tag recommendation server 40 (Block 72) may thus be considered a current score. Accordingly, the metadata tag recommendation server 40 may assign the respective current score 55 to each of the recommended social media metadata tags 52 based upon the stored respective scores over time. In other words, past scoring 55 of a given recommended social media metadata tag 52 may influence the current score of the same social media metadata tag. In some embodiments, the metadata tag recommendation server 40 may not store recommended social media metadata tags 52 and corresponding scores 55 over time and thus may assign the score without consideration of stored scores over time.

At Block 74, the metadata tag recommendation server 40 may order the recommended social media metadata tags 52 based upon the respective scores 55. For example, a highest scoring recommended social media metadata tag 52 may appear at a top of a listing of the recommended social media metadata tags when viewed by the user. In some embodiments, the metadata tag recommendation server 40 may not order the recommended social media metadata tags 52.

The metadata tag recommendation server 40 may also group the recommended social media metadata tags 52, which may be ordered by score as described above, based upon volume (Block 76). For example, as will be appreciated by those skilled in the art, it may be desirable for an intended demographic or reach to target. Accordingly, the metadata tag recommendation server 40 may group the recommended social media metadata tags 52 into groups having a volume of 500,000 and above, 100,000-499,999, and 99,999 and less. A relatively high volume social media metadata tag 52 may be considered saturated, and thus, using a recommended social media metadata tag that may be considered saturated may not be desirable for optimization. In some embodiments, the metadata tag recommendation server 40 may not group the recommended social media metadata tags 52 by volume.

At Block 80, the metadata tag recommendation server 40 communicates, for example, wirelessly over one or more of the computer networks (e.g., the Internet), the recommended social media metadata tags 52 and respective scores 55 to the user device 30. For example, the recommended social media metadata tags 52 and respective scores 55 may be displayed on a display of the user device 30. The recommended social media metadata tags 52 and respective scores 55 may be ordered and/or grouped by volume, at the user device 30 as described above. Operations end at Block 82.

Figure 4A:
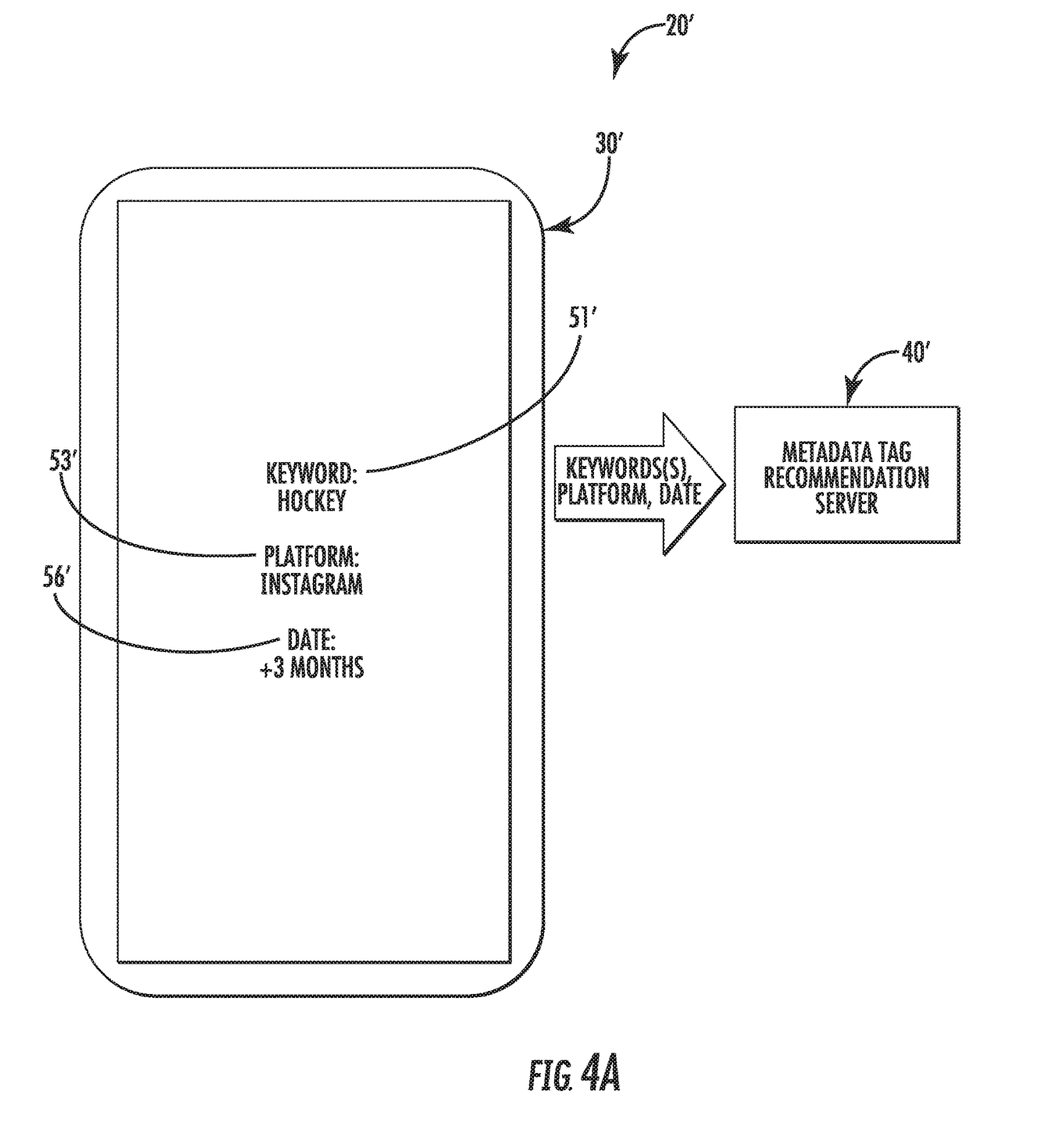
FIG. 4A is a schematic diagram of a system for recommending social media metadata tags in accordance with another embodiment.
Figure 4B:
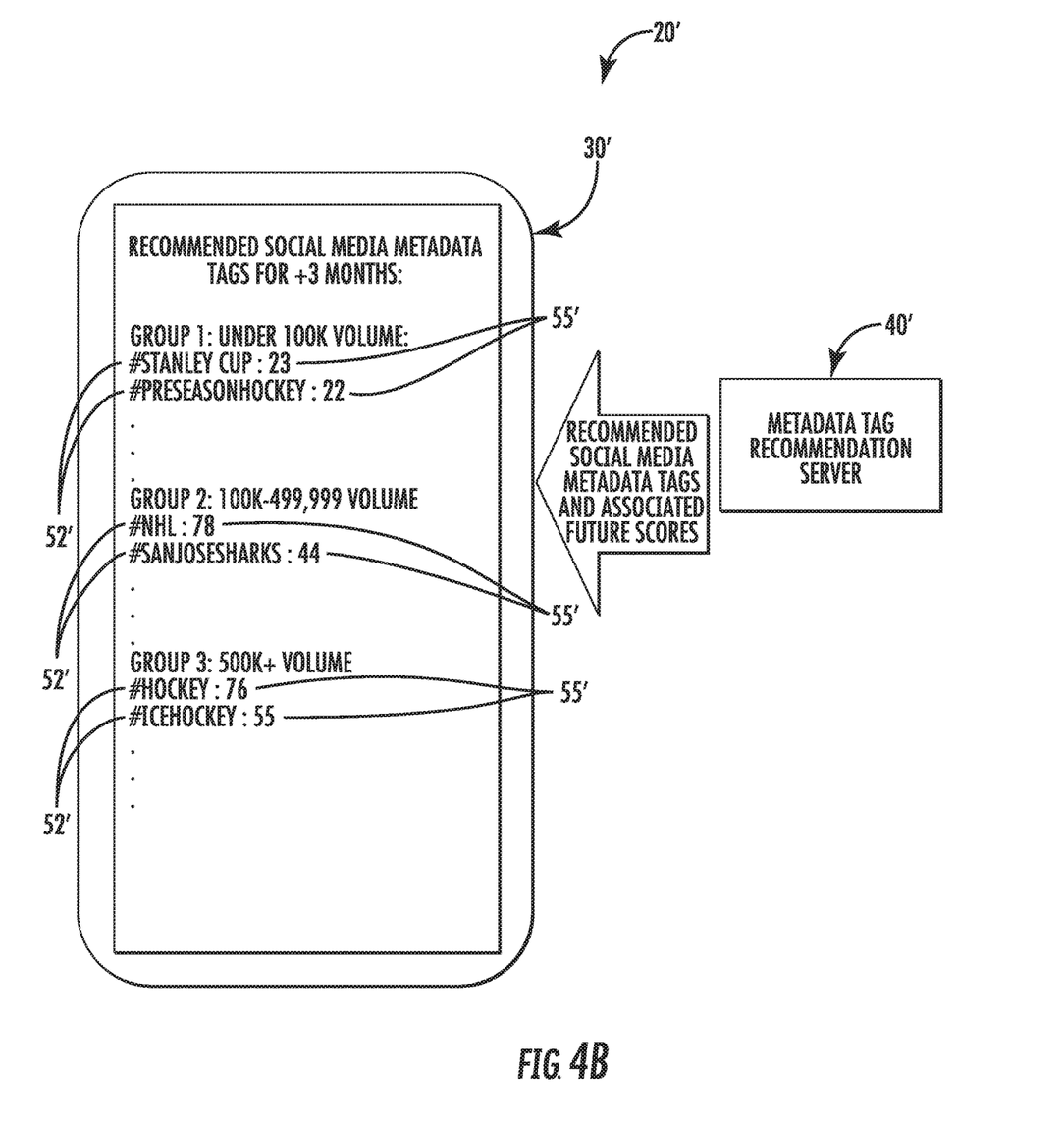
FIG. 4B is another schematic diagram of a system for recommending social media metadata tags in accordance with the embodiment of FIG. 4A.
Figure 5:
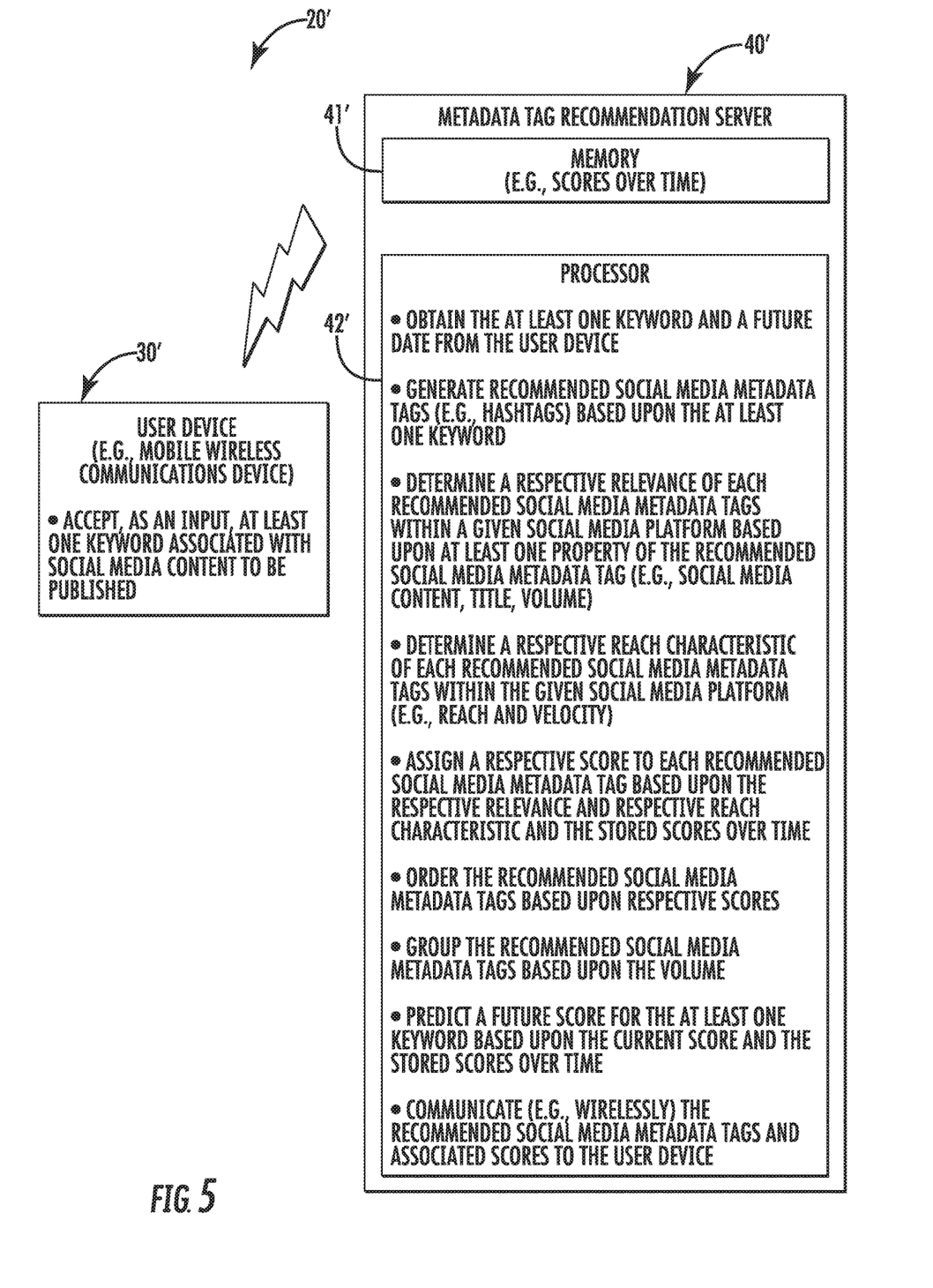
FIG. 5 is a schematic block diagram of a system for recommending social media metadata tags in accordance with the embodiment of FIGS. 4A and 4B.

Referring now additionally to FIGS. 4-5, in another embodiment where scores are stored over time (e.g., in the memory 41'), the metadata tag recommendation server 40' may be used to predict a future score 55' for recommended social media metadata tags 52' for the keyword 51'. More particularly, in addition to the keyword 51' being input at the user device 30', a future date 56' may also be input at the user device. The metadata tag recommendation server 40' may, for example, based upon a regression analysis, generate a predicted score 55' for recommended social media metadata tags 52' at the future date 56' based upon both the stored scores over time and the current score. The future recommended social media metadata tags 52' and the corresponding scores 55' may be communicated to the user device 30'. For example, for the keyword 51' "hockey," a predicted future score 55' may be higher in the months of April and May (corresponding to playoffs) as opposed to the months of December or January. Moreover, a recommended social media metadata tag 52' may have a higher predicted future score 55', if, for example, if content relating to the keyword 51' is considered to be trending. Referring again to the exemplary keyword 51' "hockey", a given recommended social media tag 52' associated with a team currently beginning a winning streak (e.g., after losing), may have a higher predicted future score 55'. Elements illustrated, but not specifically described are similar to those described above and need not be further described. In some embodiments, both current and future recommended social media tags 52' and corresponding scores 55' may be communicated to the user device 30', for example, for display thereon.

The system 20 may advantageously provide, through a relatively easy-to-use interface, improved quality and relevancy of social media metadata tags 52 by performing an analysis on a scale that goes well beyond the ability of a humans. In other words, the system 20 may utilize machine learning and artificial intelligence techniques and/or algorithms to perform the operations described above. Accordingly, the system 20 may permit, by way of choosing what may be considered the best hashtags, to increase reach, attract followers and increase engagement of content or a post on a social media platform.

A method aspect is directed to a method of recommending a plurality of social media metadata tags 52. The method includes using a metadata tag recommendation server 40 that includes a memory 41 and a processor 42 for cooperating therewith to obtain at least one keyword 51 from a user device 30. The user device 30 is configured to accept, as an input, the at least one keyword 51 associated with social media content to be published. The method also includes using the metadata tag recommendation server 40 to generate a plurality of recommended social media metadata tags 52 based upon the at least one keyword 51, and determine a respective relevance of each of the plurality of recommended social media metadata tags within a given social media platform 53 based upon at least one property of the recommended social media metadata tag. The method further includes using the metadata tag recommendation server 40 to determine a respective reach characteristic of each of the plurality of recommended social media metadata tags 52 within the given social media platform 53, and assigning a respective score 55 to each of the recommended social media metadata tags based upon the relevance and reach characteristic thereof. The method further includes using the metadata tag recommendation server 40 to communicate the plurality of recommended social media metadata tags 52, and respective scores 55 to the user device 30.

A computer readable medium aspect is directed to a non-transitory computer readable medium for recommending a plurality of social media metadata tags 52. The non-transitory computer readable medium includes computer executable instructions that when executed by a processor 41 of a metadata tag recommendation server 40 cause the processor to perform operations. The operations include obtaining at least one keyword 51 from user device 30. The user device 30 is configured to accept, as an input, the at least one keyword 51 associated with social media content to be published. The operations include generating a plurality of recommended social media metadata tags 52 based upon the at least one keyword 51, and determining a respective relevance of each of the plurality of recommended social media metadata tags within a given social media platform 53 based upon at least one property of the recommended social media metadata tag. The operations also include determining a respective reach characteristic of each of the plurality of recommended social media metadata tags 52 within the given social media platform 53 and assigning a respective score 55 to each of the recommended social media metadata tags based upon the respective relevance and respective reach characteristic thereof. The operations further include communicating the plurality of recommended social media metadata tags 52 and respective scores 55 to the user device 30.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for recommending a plurality of social media metadata tags comprising:
   a user device configured to accept, as an input, at least one keyword associated with social media content to be published; and
   a metadata tag recommendation server comprising a memory and a processor for cooperating therewith to
      obtain the at least one keyword from the user device,
      generate a plurality of recommended social media metadata tags based upon at least one of a variation of the at least one keyword and other social media metadata tags used with the at least one keyword,
      determine a respective relevance for each of the plurality of recommended social media metadata tags within a given social media platform by at least parsing respective current social media content associated with each of the plurality of recommended social media metadata tags to determine whether a topic of the current social media content is associated with at least one keyword or whether the current social media content mentions the at least one keyword, but the topic is not associated with the at least one keyword, and
      determining a respective current social media content volume associated with each of the recommended social media metadata tags based upon communication with the given social media platform,
      determine a respective reach characteristic for each of the plurality of recommended social media metadata tags within the given social media platform by at least determining a reach velocity of each of the recommended social media metadata tags by determining a change in a reach over time,
      assign a respective score to each of the recommended social media metadata tags based upon the respective relevance and respective reach characteristic thereof,
      store a plurality of the respective scores over time,
      assign a current respective score to each of the recommended social media metadata tags based upon the stored plurality of the respective scores over time,
      predict a future respective score based upon the current respective score and the stored plurality of respective scores over time, and
      communicate the plurality of recommended social media metadata tags and current and future respective scores to the user device so that the recommended social media metadata tags increase reach, attract followers, and increase engagement with the social media content to be published.

2. The system of claim 1 wherein the metadata tag recommendation server is configured to determine the respective relevance for each of the plurality of recommended social media metadata tags by at least obtaining titles for current social media content on the given social media platform associated with each of the plurality of recommended social media metadata tags.

3. The system of claim 1 wherein the processor is configured to group the plurality of recommended social media metadata tags based upon the respective current social media content volumes.

4. The system of claim 1 wherein the plurality of recommended social media metadata tags comprises a plurality of recommended social media hashtags.

5. The system of claim 1 wherein the respective reach characteristic comprises the respective reach of each of the plurality of recommended social media metadata tags.

6. The system of claim 1 wherein the processor is configured to order the plurality of recommended social media metadata tags based upon the respective scores.

7. A metadata tag recommendation server comprising:
   a memory and a processor for cooperating therewith to
      obtain at least one keyword from a user device, the user device configured to accept, as an input, at least one keyword associated with social media content to be published,
      generate a plurality of recommended social media metadata tags based upon at least one of a variation of the at least one keyword and other social media metadata tags used with the at least one keyword,
      determine a respective relevance for each of the plurality of recommended social media metadata tags within a given social media platform by at least parsing respective current social media content associated with each of the plurality of recommended social media metadata tags to determine whether a topic of the current social media content is associated with at least one keyword or whether the current social media content mentions the at least one keyword, but the topic is not associated with the at least one keyword, and determining a respective current social media content volume associated with each of the recommended social media metadata tags based upon communication with the given social media platform, determine a respective reach characteristic for each of the plurality of recommended social media metadata tags within the given social media platform by at least determining a reach velocity of each of the recommended social media metadata tags by determining a change in a reach over time, assign a respective score to each of the recommended social media metadata tags based upon the respective relevance and respective reach characteristic thereof, store a plurality of the respective scores over time, assign a current respective score to each of the recommended social media metadata tags based upon the stored plurality of the respective scores over time, predict a future respective score based upon the current respective score and the stored plurality of respective scores over time, and communicate the plurality of recommended social media metadata tags and current and future respective scores to the user device so that the recommended social media metadata tags increase reach, attract followers, and increase engagement with the social media content to be published.

8. The metadata tag recommendation server of claim 7 wherein the processor is configured to determine the respective relevance for each of the plurality of recommended social media metadata tags by at least obtaining respective titles of current social media content on the given social media platform associated with each of the plurality of recommended social media metadata tags.

9. The metadata tag recommendation server of claim 7 wherein the plurality of recommended social media metadata tags comprises a plurality of recommended social media hashtags.

10. The metadata tag recommendation server of claim 7 wherein the respective reach characteristic comprises at least one of the respective reach of each of the plurality of recommended social media metadata tags.

11. The metadata tag recommendation server of claim 7 wherein the processor is configured to order the plurality of recommended social media metadata tags based upon the respective scores.

12. A method of recommending a plurality of social media metadata tags comprising:

using a metadata tag recommendation server comprising a memory and a processor for cooperating therewith to obtain at least one keyword from a user device, the user device configured to accept, as an input, the at least one keyword associated with social media content to be published, generate a plurality of recommended social media metadata tags based upon at least one of a variation of the at least one keyword and other social media metadata tags used with the at least one keyword, determine a respective relevance for each of the plurality of recommended social media metadata tags within a given social media platform by at least parsing respective current social media content associated with each of the plurality of recommended social media metadata tags to determine whether a topic of the current social media content is associated with at least one keyword or whether the current social media content mentions the at least one keyword, but the topic is not associated with the at least one keyword, and determining a respective current social media content volume associated with each of the recommended social media metadata tags based upon communication with the given social media platform, determine a respective reach characteristic of each of the plurality of recommended social media metadata tags within the given social media platform by at least determining a reach velocity of each of the recommended social media metadata tags by determining a change in a reach over time, assign a respective score to each of the recommended social media metadata tags based upon the respective relevance and respective reach characteristic thereof, store a plurality of the respective scores over time, assign a current respective score to each of the recommended social media metadata tags based upon the stored plurality of the respective scores over time, predict a future respective score based upon the current respective score and the stored plurality of respective scores over time, and communicate the plurality of recommended social media metadata tags and current and future respective scores to the user device so that the recommended social media metadata tags increase reach, attract followers, and increase engagement with the social media content to be published.

13. The method of claim 12 wherein using the metadata tag recommendation server comprises using the metadata tag recommendation server to determine the respective relevance for each of the plurality of recommended social media metadata tags by at least obtaining titles for current social media content on the given social media platform associated with each of the plurality of recommended social media metadata tags.

14. The method of claim 12 wherein the plurality of recommended social media metadata tags comprises a plurality of recommended social media hashtags.

15. The method of claim 12 wherein the respective reach characteristic comprises the respective reach velocity of each of the plurality of recommended social media metadata tags.

16. The method of claim 12 wherein using the metadata tag recommendation server comprises using the metadata tag recommendation server to order the plurality of recommended social media metadata tags based upon the respective scores.

17. A non-transitory computer readable medium for recommending a plurality of social media metadata tags, the non-transitory computer readable medium comprising computer executable instructions that when executed by a processor of a metadata tag recommendation server cause the processor to perform operations comprising:

obtaining at least one keyword from a user device, the user device configured to accept, as an input, the at least one keyword associated with social media content to be published;

generating a plurality of recommended social media metadata tags based upon at least one of a variation of the at least one keyword and other social media metadata tags used with the at least one keyword;

determining a respective relevance for each of the plurality of recommended social media metadata tags within a given social media platform by at least parsing respective current social media content associated with each of the plurality of recommended social media metadata tags to determine whether a topic of the current social media content is associated with at least one keyword or whether the current social media content mentions the at least one keyword, but the topic is not associated with the at least one keyword, and determining a respective current social media content volume associated with each of the recommended social media metadata tags based upon communication with the given social media platform;

determining a respective reach characteristic of each of the plurality of recommended social media metadata tags within the given social media platform by at least determining a reach velocity of each of the recommended social media metadata tags by determining a change in a reach over time;

assigning a respective score to each of the recommended social media metadata tags based upon the respective relevance and respective reach characteristic thereof;

storing a plurality of the respective scores over time, assigning a current respective score to each of the recommended social media metadata tags based upon the stored plurality of the respective scores over time;

predicting a future respective score based upon the current respective score and the stored plurality of respective scores over time; and communicating the plurality of recommended social media metadata tags and current and future respective scores to the user device so that the recommended social media metadata tags increase reach, attract followers, and increase engagement with the social media content to be published.

18. The non-transitory computer readable medium of claim 17 wherein the operations comprise determining the respective relevance for each of the plurality of recommended social media metadata tags by at least obtaining titles for current social media content on the given social media platform associated with each of the plurality of recommended social media metadata tags.

19. The non-transitory computer readable medium of claim 17 wherein the plurality of recommended social media metadata tags comprises a plurality of recommended social media hashtags.

20. The non-transitory computer readable medium of claim 17 wherein the respective reach characteristic comprises the respective reach velocity of each of the plurality of recommended social media metadata tags.

21. The non-transitory computer readable medium of claim 17 wherein the operations comprise assigning a current respective score to each of the recommended social media metadata tags based upon a stored plurality of the respective scores over time.

* * * * *